(12) United States Patent
Selvaraj et al.

(10) Patent No.: US 8,224,473 B2
(45) Date of Patent: Jul. 17, 2012

(54) APPARATUS AND METHOD FOR MONITORING AN INDUSTRIAL PROCESS

(75) Inventors: Sankar Selvaraj, Singapore (SG);
Joseph Ching Hua Lee, Singapore (SG); Sreenivas Yelneedi, Singapore (SG)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 261 days.

(21) Appl. No.: 12/693,830

(22) Filed: Jan. 26, 2010

(65) Prior Publication Data

US 2010/0286969 A1 Nov. 11, 2010

(30) Foreign Application Priority Data

May 5, 2009 (SG) .................. 200903088-3

(51) Int. Cl.
*G06F 11/30* (2006.01)
(52) U.S. Cl. ......... 700/108; 702/179; 702/182; 345/440
(58) Field of Classification Search .................. 700/108, 700/109, 110; 702/81, 82, 83, 84, 179, 180, 702/181, 182, 183, 187, 188; 703/2, 6, 7, 703/13; 345/440; 715/215; 717/104, 132, 717/133, 154, 156
See application file for complete search history.

(56) References Cited

U.S. PATENT DOCUMENTS

| | | | | |
|---|---|---|---|---|
| 7,239,316 B1 * | 7/2007 | Cox et al. | ...................... | 345/440 |
| 7,533,009 B2 * | 5/2009 | Watanabe et al. | .................. | 703/6 |
| 7,565,270 B2 * | 7/2009 | Bramwell et al. | ............. | 702/183 |
| 7,734,436 B2 * | 6/2010 | Labreche et al. | ................ | 702/81 |
| 2009/0020693 A1 * | 1/2009 | Yamaguchi | ..................... | 702/27 |
| 2009/0112532 A1 * | 4/2009 | Foslien et al. | ...................... | 703/2 |
| 2010/0079488 A1 * | 4/2010 | McGreevy et al. | ............ | 345/629 |

FOREIGN PATENT DOCUMENTS

| | | |
|---|---|---|
| WO | 2007/047868 A2 | 4/2007 |
| WO | 2007/143405 A2 | 12/2007 |
| WO | 2008/112823 A1 | 9/2008 |

OTHER PUBLICATIONS

Singapore Examination Report dated Aug. 4, 2011, issued in corresponding Singapore Patent Application No. 200903088-3.
Singapore Search Report dated Aug. 4, 2011, issued in corresponding Singapore Patent Application No. 200903088-3.

* cited by examiner

*Primary Examiner* — Charles Kasenge
(74) *Attorney, Agent, or Firm* — Westerman, Hattori, Daniels & Adrian, LLP

(57) ABSTRACT

An apparatus for monitoring an industrial process comprising a plurality of variables. The apparatus comprises a defining module configured for defining a normal-condition data set may comprise data values of the variables when the industrial process is operating under a normal condition and for defining an abnormal-condition data set may comprise data values of the variables when the industrial process is operating under an abnormal condition; a modelling module configured for modelling a normal-condition model from the normal-condition data set and modelling an abnormal-condition model from the abnormal-condition data set; a plotting module configured for plotting a normal-condition plot from the normal-condition model and plotting an abnormal-condition plot from the abnormal-condition model; and an analysis module configured for analysing live data values of the variables for simultaneous display with the normal-condition plot and the abnormal-condition plot.

17 Claims, 5 Drawing Sheets

APPARATUS AND METHOD FOR MONITORING AN INDUSTRIAL PROCESS

FIELD OF THE INVENTION

The invention relates to an apparatus and method for monitoring an industrial process and particularly, though not exclusively, relates to monitoring deviations in process conditions.

BACKGROUND

Many industrial processes are highly complex, involving many devices, different pieces of equipment and sub-processes. This gives rise to many operating or process variables that must be monitored and analysed for online or offline fault detection to be performed and any process deviation to be understood, so that problems can be addressed, and similar problems avoided or prevented from recurring in future. Monitoring an industrial process therefore includes monitoring the performance of various targets, wherein a given target may be a piece of equipment or a process condition.

Principal Component Analysis (PCA) is a monitoring analysis tool involving multivariate statistical techniques that may be applied to monitoring industrial processes that involve many variables. Using mathematical procedures, PCA transforms a number of possibly correlated variables into a smaller number of uncorrelated variables called principal components. The first principal component accounts for as much of the variability in the data as possible, while each succeeding principal component accounts for the remaining variability with decreasing magnitude. PCA may therefore be considered as revealing the internal structure of data in a way which best explains variance in the data. PCA may be used to derive other performance indicators such as Hotelling's T-square Deviation, Squared Prediction Error (SPE), and Scores and Loadings information from the PCA itself.

Currently, PCA has been used to derive models that replicate the best operating practices of specific industrial processes. A typical best-practice model derived from PCA may be displayed on an Advanced Area Monitoring (AAM) Plot as a bound area comprising a set of principal components derived from data values of variables obtained when the industrial process was operating under normal or acceptable conditions, i.e., the bound area represents a normal condition of the industrial process and can be considered a normal-condition area.

In use, an Advanced Area Monitoring (AAM) Plot may be generated using PCA for data values of the variables obtained from an industrial process during a particular period of operation, as shown in FIG. 1. The AAM plot 1000 typically displays a best-practice model 2000 that has earlier been derived for that particular industrial process, while PCA scores information 3000 derived from operations data values of the variables are projected onto the best-practice model 2000. Where the scores information 3000 fall within the best-practice model 2000, it can be considered that the industrial process was operating normally during that period of operation. If the scores information 3000 fall outside the bound area 2000, it can be considered that process deviation or equipment degradation had occurred for that particular period of operation.

Currently, PCA and AAM plots are mostly used only after a fault or process deviation has already occurred in an industrial process, in an attempt to analyse the problem. This is mainly because it is time consuming for the process engineers to prepare data sets of variables for analysis. Also, understanding the results of analysis requires substantial subject expertise in the process engineer in order for meaningful interpretations of the analysis results to be made, and for translating the results of analysis into action to be undertaken by process operators.

SUMMARY OF THE INVENTION

According to a first exemplary embodiment, there is provided an apparatus for monitoring an industrial process comprising a plurality of variables. The apparatus comprises a defining module configured for defining a normal-condition data set may comprise data values of the variables when the industrial process is operating under a normal condition and for defining an abnormal-condition data set may comprise data values of the variables when the industrial process is operating under an abnormal condition; a modelling module configured for modelling a normal-condition model from the normal-condition data set and modelling an abnormal-condition model from the abnormal-condition data set; a plotting module configured for plotting a normal-condition plot from the normal-condition model and plotting an abnormal-condition plot from the abnormal-condition model; and an analysis module configured for analysing live data values of the variables for simultaneous display with the normal-condition plot and the abnormal-condition plot.

The apparatus may comprise a display module configured for simultaneously displaying the modelled normal area, the modelled abnormal area, and the analysed live data values.

The apparatus may further comprise a database for storing therein, and retrieving therefrom, data sets, modelled areas, and analysed data values.

The defining module may further be configured for pre-processing data values of the variables.

The modelling module preferably uses principal component analysis.

The plotting module preferably uses advanced area monitoring.

The apparatus may further comprise at least one user interface for providing access to the defining module and the display module.

According to a second exemplary aspect, there is provided a method of monitoring an industrial process comprising a plurality of variables. The method comprises defining a normal-condition data set may comprise data values of the variables when the industrial process is operating under a normal condition; defining an abnormal-condition data set may comprise data values of the variables when the industrial process is operating under an abnormal condition; modelling a normal-condition model from the normal-condition data set; modelling an abnormal-condition model from the abnormal-condition data set; plotting a normal-condition plot from the normal-condition model; plotting an abnormal-condition plot from the abnormal-condition model; and analysing live data values of the variables for simultaneous display with the normal-condition plot and the abnormal-condition plot.

The method may comprise simultaneously displaying the normal-condition plot, the abnormal-condition plot, and the analysed live data values.

The method may comprise storing and retrieving data sets, models, plots, and analysed data values in and from a database.

The method may further comprise pre-processing data values of the variables before modelling the normal-condition model and the abnormal-condition model.

Modelling the normal-condition model preferably includes constructing a principal component analysis model from the normal-condition data set.

Modelling the abnormal-condition model preferably includes projecting the abnormal-condition data set onto a principal component analysis model constructed from the normal-condition data set and generating a principal component analysis model for the abnormal-condition data set. The method of any one of claims 8 to 13, wherein plotting the normal-condition plot includes generating a normal-condition advanced area monitoring plot from model geometry exported from the normal-condition model.

Plotting the abnormal-condition plot preferably includes generating an abnormal-condition advanced area monitoring plot from model geometry exported from the abnormal-condition model.

Analysing the live data values of the variables preferably includes performing principal component analysis on the live data values to obtain live scores information, and may further include projecting the live scores information onto a display of the normal-condition plot and the abnormal-condition plot.

BRIEF DESCRIPTION OF THE DRAWINGS

In order that the invention may be fully understood and readily put into practical effect there shall now be described by way of non-limitative example only exemplary embodiments of the present invention, the description being with reference to the accompanying illustrative drawings.

In the drawings.

DETAILED DESCRIPTION OF THE EXEMPLARY EMBODIMENTS

Figure 1:
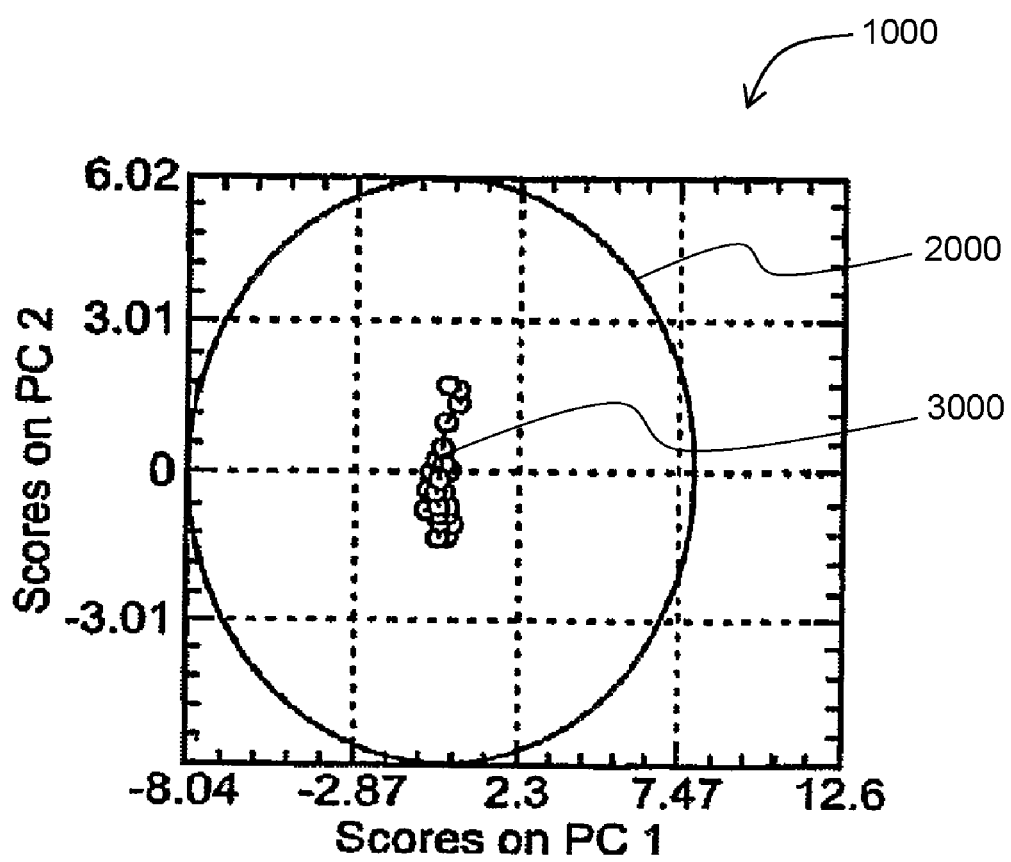
FIG. 1 is a schematic illustration of a prior art Advanced Area Monitoring Plot.
Figure 2:
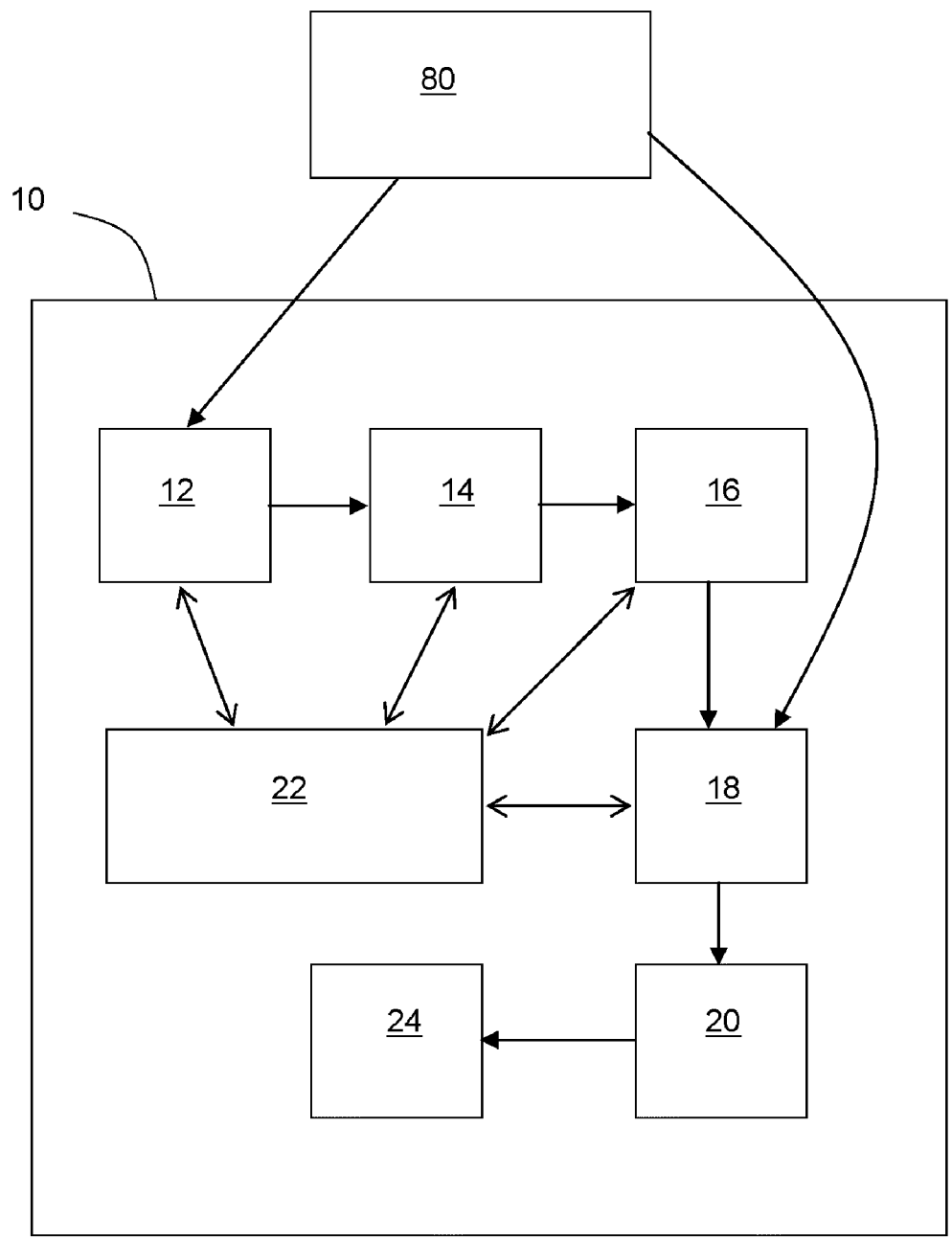
FIG. 2 is an architecture diagram of an exemplary apparatus for monitoring an industrial process.
Figure 3:
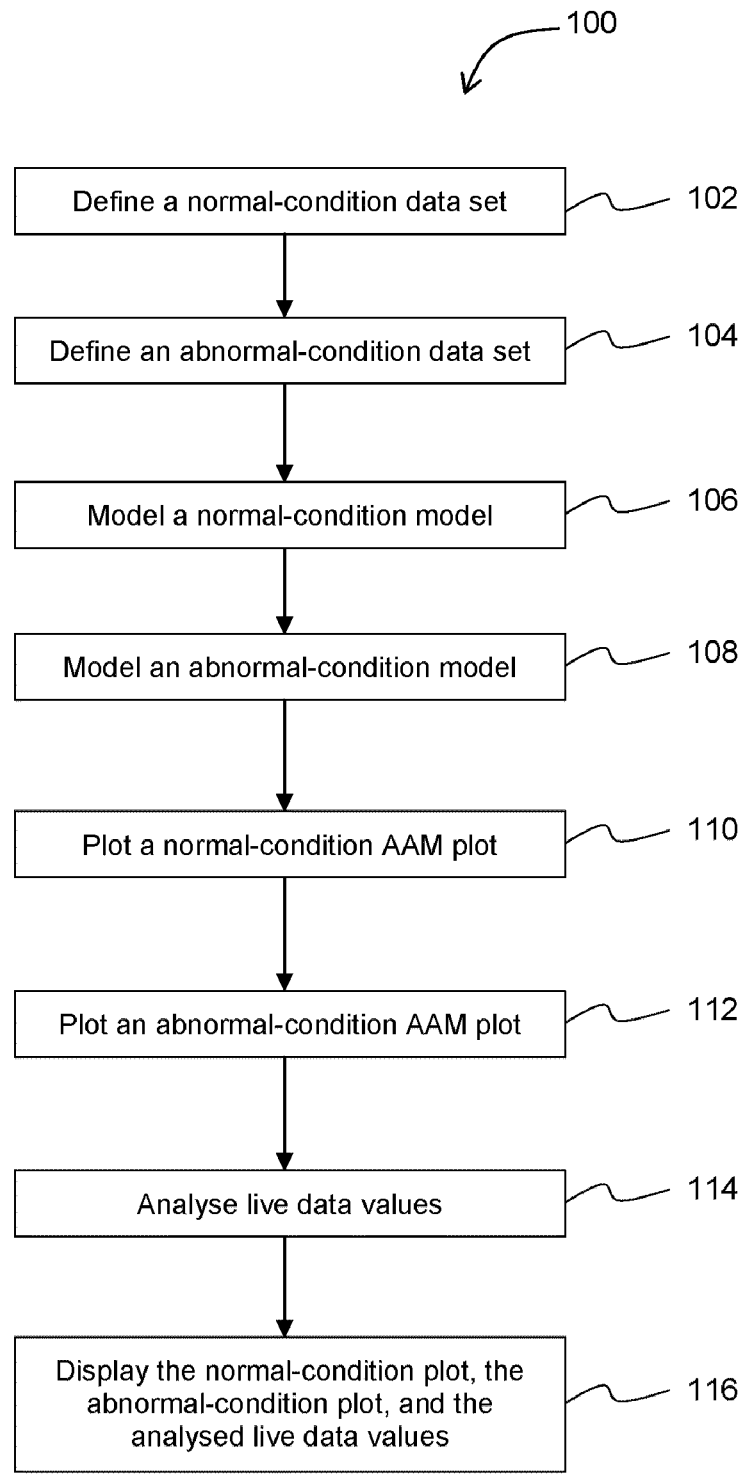
FIG. 3 is a flow chart of an exemplary method of monitoring an industrial process.

As shown in FIGS. 2 and 3, an exemplary apparatus 10 and method 100 are provided for monitoring an industrial process 80.

The apparatus 10 comprises a defining module 12 configured for defining data sets. Data sets are defined from data values of process variables involved in the industrial process 80, obtained during operation of the process 80 over a period of time. Preferably, data values are obtained for each variable in the process 80 for a duration of a complete process cycle.

Figure 4:
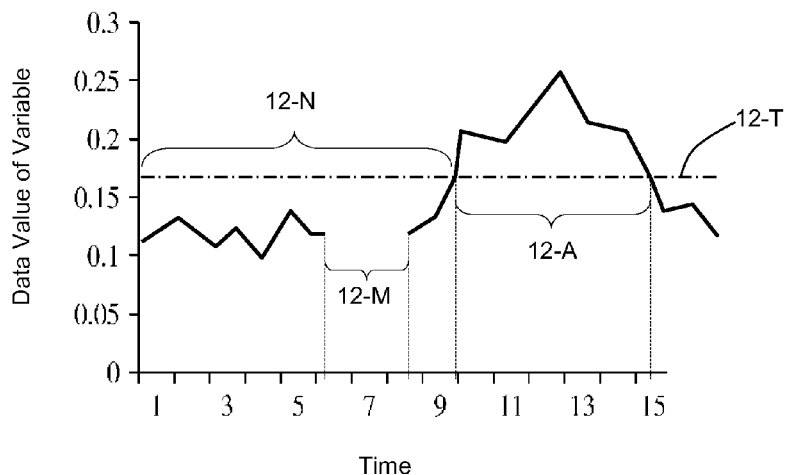
FIG. 4 is an exemplary graph of data values of a variable during a period of operation of an exemplary industrial process.

FIG. 4 shows an exemplary curve of data values obtained for an exemplary variable in an exemplary industrial process 80. The defining module 12 is configured such that it allows a user, such as a process operator, to define a normal-condition data set 12-N, 102 from the graph. For example, defining the normal-condition data set 12-N may be as simple as selecting data values of a variable (e.g. temperature) that fall within a certain acceptable threshold value 12-T when the process is operating under a normal condition. An abnormal-condition data set 12-A is also defined 104 by selecting data values that are obtained from the process when the process operates under an abnormal condition, i.e. the abnormal-condition data values of the variable are values that exceed the acceptable threshold value 12-T. Different abnormal conditions of the industrial process may be defined using the defining module 12 by appropriately selecting data values to define data sets for all the variables involved in the process and by appropriately grouping abnormal-condition data values of different variables under known and discrete causes that resulted in process faults or deviations. For one industrial process 80, multiple abnormal-condition data sets may thus be defined by collecting and observing data values of the variables over a number of process cycles.

The defining module 12 preferably also comprises an extensive data pre-processing function configured to pre-treat or pre-process collected data values. For example, where there are missing data values 12-M or invalid values such as artifact spikes due to errors in data collection, the pre-processing function of the defining module 12 automatically fills in the missing data values with estimated values, and deselects or removes invalid values when defining the data sets 12-N, 12A. The defining module 12 is therefore configured to allow a process operator to prepare data sets for analysis in a simple, thorough and efficient manner, aided by the data pre-processing function.

Defined data sets 12-N, 12-A are preferably stored in a database 22 for subsequent retrieval and use. In the exemplary method 100, the defined normal-condition data set 12-N is used by a modelling module 14 of the apparatus 10 to model a normal-condition PCA model 106 by performing PCA on the normal-condition data set 12-N and constructing a PCA model from the normal-condition data set 12-N.

The modelling module 14 is also used to model one or more abnormal-condition PCA models 108. Each abnormal-condition model is modelled by projecting a corresponding abnormal-condition data set 12-A onto the PCA model constructed from the normal-condition data set 12-N and generating the abnormal-condition model. In this way, multiple abnormal-condition PCA models may be modelled using the modelling module 14. The normal-condition and abnormal condition PCA models produced by the modelling module 14 are preferably stored in the database 22 for subsequent retrieval and use.

Preferably, the modelling module 14 is also configured to export individual model parameters for online monitoring purpose and to export individual model geometries to a plotting module 16 of the apparatus 10 for plotting corresponding AAM plots 110, 112. Model parameters and geometries are preferably also stored in the database 22 for subsequent retrieval and use.

Figure 5:
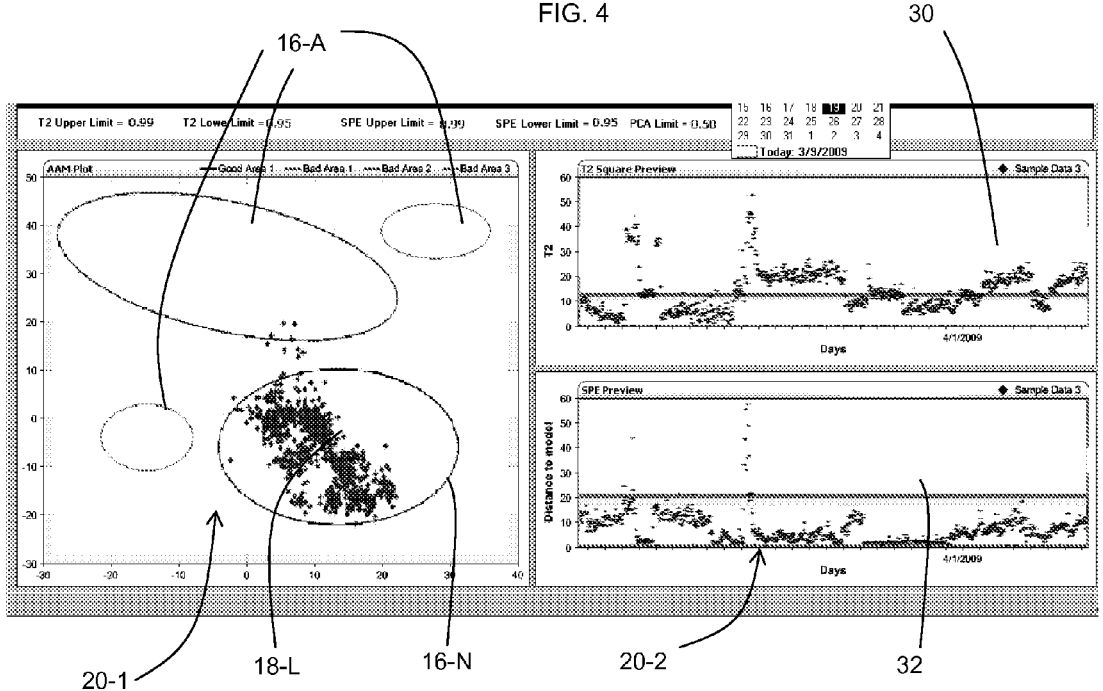
FIG. 5 is a schematic view of an exemplary Advanced Area Monitoring Plot derived using the apparatus of FIG. 2 and the method of FIG. 3.
Figure 6:
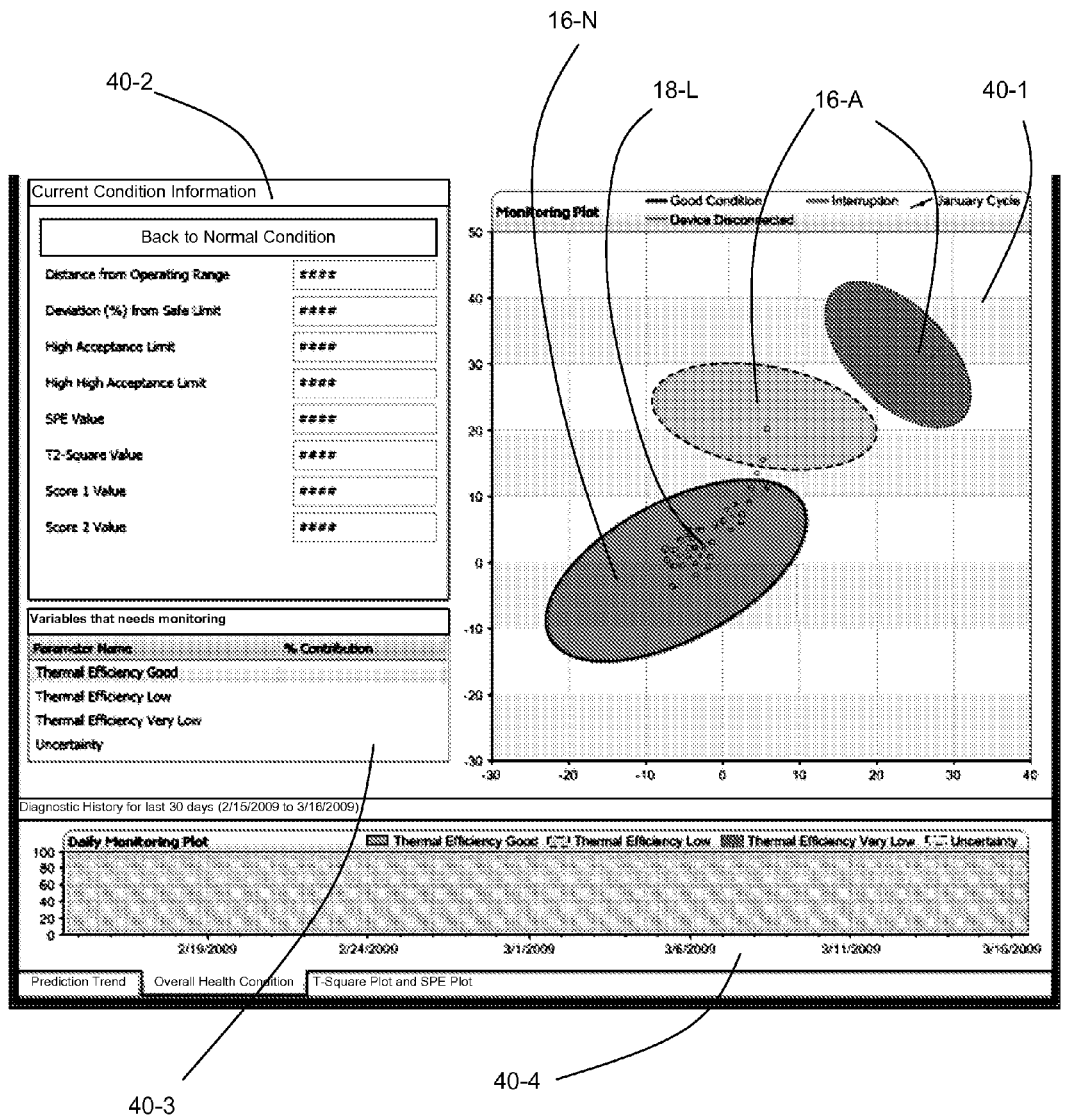
FIG. 6 is a schematic view of another exemplary Advanced Area Monitoring Plot derived using the apparatus of FIG. 2 and the method of FIG. 3.

Using the plotting module 16, a normal-condition AAM plot is generated 110 from model geometry exported from the normal-condition PCA model. Similarly, abnormal-condition AAM plots are generated 112 from model geometry exported from the abnormal-condition PCA models. All generated AAM plots are preferably stored in the database 22 for subsequent retrieval and use. As shown in FIGS. 5 and 6, a graphical display 20-1, 40-1 of a complete exemplary AAM plot according to the present invention simultaneously shows the normal-condition plot 16-N and the abnormal-condition plots 16-A as discrete bound areas. Each abnormal-condition plot 16-A preferably represents a specific known abnormality that can occur for that industrial process 80. For example, in a typical catalytic cracking furnace of an ethylene cracker facility where feedstock is continuously heated and cracked inside the furnace tubes, one abnormal-condition plot 16-A may represent over-heating of the furnace, while another abnormal-condition plot 16-A may represent plugging of an inlet or outlet. Other abnormal conditions could be low burner efficiency or excess air, all of which have identifiable data values for the process variables involved. The plotting module 16 is therefore preferably configured for the process operator to select which among a plurality of abnormal conditions are to be plotted and/or displayed, if at all.

FIGS. 5 and 6 also show live scores information 18-L projected onto the graphical displays 20-1, 40-1 of the AAM plots. Live scores information 18-L is generated by analysing live data values 114 obtained from a current operations of the industrial process 80 using an analysis module 18 of the apparatus 10 configured for that purpose. Analysing live data values 114 preferably involves performing PCA on live data values obtained from the industrial process 80 to generate the live scores information 18-L, and subsequently projecting the live scores information 18-L onto the AAM plot display 20-1, 40-1. Projecting the live scores information 18-L preferably includes mapping necessary live or online tags with reference to the earlier generated PCA models and presenting the results onto the AAM plot display 20-1, 40-1. The live scores information 18-L is preferably also stored in the database 22 for subsequent retrieval and use.

Where the live scores information 18-L fall within the normal-condition plot 16-N, it can be considered that the industrial process is currently operating normally. Where the scores information 18-L fall outside the normal-condition plot 16-N, it can be considered that process deviation has occurred or is occurring. Live scores information 18-L falling outside the normal-condition plot 16-N can therefore be taken as a trigger or alert for the process operator to take action on current operations of the industrial process 80.

Preferably, a display module 20 is provided to simultaneously display the abnormal-condition plots 16-A together with the normal-condition plot 16-N 116 on a single graphical display 20-1, 40-1 that is provided to a user on a user console 24. As shown in FIG. 5, the AAM plot 20-1 may be displayed together with deviation or variation reports 20-2 obtained by other statistical methods in order to corroborate results of the PCA and AAM plots. For example, the other reports 20-2 may comprise Hotelling's T-square Deviation results 30 and results from SPE analysis 32. The AAM plot 40-1 may also be displayed together with other tables containing information such as current conditions 40-2, variables that need monitoring 40-3 or a diagnostic history 40-4 over a certain period of time.

By simultaneously displaying the abnormal-condition plots 16-A with the normal-condition plot 16-N and projecting the live scores information 18-L onto the display 20-1, 40-1, a user is immediately provided with visual indication as to how the industrial process 80 is deviating from the normal condition, i.e., the live scores information 18-L visually indicate what abnormality is occurring by the placement of the scores information 18-L on the AAM display 20-1, 40-1 with respect to the various discrete abnormal-condition plots 16-A. Such visual indication reduces the need for a user to perform process diagnostics to find out what problems are occurring since it is already shown on the AAM display 20-1, 40-1. The user therefore does not require substantial subject expertise in order to understand the results of the PCA and AAM plots. The apparatus 10 and method 100 thus allow a user to identify key variables responsible for deviation from the normal condition so as to understand the cause(s) of deviation. The apparatus 10 and method 100 also allow patterns of degradation to be captured, thereby allowing systemic errors in the process 80 to be identified and corrected.

Whilst there has been described in the foregoing description exemplary embodiments of the present invention, it will be understood by those skilled in the technology concerned that many variations in details of design, construction and/or operation may be made without departing from the present invention. For example, besides PCA, reference models may be made using other statistical tools while still monitoring the industrial process using information from multiple models. The concept of AAM may be imported on to a simple graphical interface such as a Microsoft Excel™ spreadsheet for an alternative method of accessing the information.

The invention claimed is:

1. An apparatus for monitoring an industrial process, the industrial process comprising a plurality of variables, the apparatus comprising:
   a defining module configured for defining a normal-condition data set comprising data values of the variables when the industrial process is operating under a normal condition and for defining an abnormal-condition data set comprising data values of the variables when the industrial process is operating under an abnormal condition;
   a modeling module configured for modeling a normal-condition model from the normal-condition data set and modeling an abnormal-condition model by projecting the abnormal-condition data set onto the normal-condition model;
   a plotting module configured for plotting a normal-condition plot from the normal-condition model and plotting an abnormal-condition plot from the abnormal-condition model; and
   an analysis module configured for analyzing live data values of the variables for simultaneous display with the normal-condition plot and the abnormal-condition plot.

2. The apparatus of claim 1, further comprising a display module configured for simultaneously displaying the normal-condition plot, the abnormal-condition plot, and the analyzed live data values.

3. The apparatus of claim 1, further comprising a database for storing therein, and retrieving therefrom, data sets, models, plots, and analyzed data values.

4. The apparatus of claim 1, wherein the defining module is further configured for pre-processing data values of the variables.

5. The apparatus of claim 1, wherein the modeling module uses principal component analysis.

6. The apparatus of claim 1, wherein the plotting module uses advanced area monitoring.

7. The apparatus of claim 1, further comprising at least one user interface for providing access to the defining module and the display module.

8. A method of monitoring an industrial process, the industrial process comprising a plurality of variables, the method comprising:
   defining a normal-condition data set comprising data values of the variables when the industrial process is operating under a normal condition;
   defining an abnormal-condition data set comprising data values of the variables when the industrial process is operating under an abnormal condition;
   modeling a normal-condition model from the normal-condition data set;
   modeling an abnormal-condition model by projecting the abnormal-condition data set onto the normal-condition model;
   plotting a normal-condition plot from the normal-condition model;
   plotting an abnormal-condition plot from the abnormal-condition model; and analyzing live data values of the variables for simultaneous display with the normal-condition plot and the abnormal-condition plot.

9. The method of claim 8, further comprising simultaneously displaying the normal-condition plot, the abnormal-condition plot, and the analyzed live data values.

10. The method of claim 8, further comprising storing and retrieving data sets, models, plots, and analyzed data values in and from a database.

11. The method of claim 8, further comprising pre-processing data values of the variables before modeling the normal-condition model and the abnormal-condition model.

12. The method of claim 8, wherein modeling the normal-condition model includes constructing a principal component analysis model from the normal-condition data set.

13. The method of claim 8, wherein modeling the abnormal-condition model includes projecting the abnormal-condition data set onto a principal component analysis model constructed from the normal-condition data set and generating a principal component analysis model for the abnormal-condition data set.

14. The method of claim 8, wherein plotting the normal-condition plot includes generating a normal-condition advanced area monitoring plot from model geometry exported from the normal-condition model.

15. The method of claim 8, wherein plotting the abnormal-condition plot includes generating an abnormal-condition advanced area monitoring plot from model geometry exported from the abnormal-condition model.

16. The method of claim 8, wherein analyzing the live data values of the variables includes performing principal component analysis on the live data values to obtain live scores information.

17. The method of claim 16, wherein analyzing the live data values further includes projecting the live scores information onto a display of the normal-condition plot and the abnormal-condition plot.

* * * * *